US010930959B2

(12) United States Patent
Chen et al.

(10) Patent No.: US 10,930,959 B2
(45) Date of Patent: Feb. 23, 2021

(54) FUEL CELL SYSTEM

(71) Applicant: National Chiao Tung University, Hsinchu (TW)

(72) Inventors: Tsung-Lin Chen, Taipei (TW); Chien-Chang Wu, Changhua County (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 104 days.

(21) Appl. No.: 15/996,257

(22) Filed: Jun. 1, 2018

(65) Prior Publication Data

US 2018/0351186 A1 Dec. 6, 2018

(30) Foreign Application Priority Data

Jun. 2, 2017 (TW) .................................. 106118349

(51) Int. Cl.
H01M 8/04 (2016.01)
H01M 8/04992 (2016.01)
H01M 8/04537 (2016.01)
H01M 8/04858 (2016.01)

(52) U.S. Cl.
CPC ..... H01M 8/04992 (2013.01); H01M 8/0488 (2013.01); H01M 8/04552 (2013.01)

(58) Field of Classification Search
CPC ...... H01M 8/04; H01M 8/10; H01M 8/04992; H01M 8/04537
See application file for complete search history.

(56) References Cited

U.S. PATENT DOCUMENTS

| 2007/0077468 | A1* | 4/2007 | Norimatsu | H01M 8/04007 429/431 |
| 2007/0202371 | A1* | 8/2007 | Takeda | H01M 8/04365 429/432 |
| 2009/0197126 | A1* | 8/2009 | Ganapathy | H01M 8/04559 429/431 |
| 2009/0325007 | A1 | 12/2009 | Grover et al. | |
| 2012/0249094 | A1* | 10/2012 | Zhao | H02M 3/00 323/234 |
| 2013/0307340 | A1* | 11/2013 | Subramanium | H02M 1/4225 307/72 |

(Continued)

OTHER PUBLICATIONS

Luo et al., "A Classification and Evaluation of Paralleling Methods for Power Supply Modules", 1999, pp. 901-908.

(Continued)

Primary Examiner — Kenneth J Douyette
(74) Attorney, Agent, or Firm — Muncy, Geissler, Olds & Lowe, P.C.

(57) ABSTRACT

A fuel cell system includes a comparator, a signal tracking controller, a first load distribution controller, a first loop gain controller, a first adder, a first PWM controller, a first fuel cell and power converter, a second load distribution controller, a second loop gain controller, a second adder, a second PWM controller, and a second fuel cell and power converter. According to the proposed fuel cell parallel system, each fuel cell connected in parallel can have a different output voltage, but the voltage at the load side can be maintained. In addition, the power output ratio of each fuel cell can be controlled under the nominal load conditions and the load varied.

8 Claims, 10 Drawing Sheets

(56) References Cited

U.S. PATENT DOCUMENTS

2014/0055077 A1* 2/2014 Barrass .................... H02P 7/04
318/700

OTHER PUBLICATIONS

Choe et al., "A Parallel Operation Algorithm with Power-Sharing Technique for FC Generation Systems", 2009, pp. 725-731.
Wang et al., "Control of PEM Fuel Cell Distrubuted Generation Systems", IEEE Transaction on Energy Conversion, Jun. 2006, pp. 586-595.
Ozpineci et al., "Trade Study on Aggregation of Multiplae 10-KW Solid Oxide Fuel Cell Power Modules", Nov. 29, 2004, 57 pages.

\* cited by examiner

FUEL CELL SYSTEM

RELATED APPLICATIONS

This application claims priority to Taiwan Application Serial Number 106118349, filed Jun. 2, 2017, which is herein incorporated by reference.

BACKGROUND OF THE INVENTION

1. Field of the Invention

The invention relates to a fuel cell. Particularly, the invention relates to a fuel cell system having fuel cells with different characteristics.

2. Description of the Prior Art

In a fuel cell system, the power generation ability of a cell module is typical between 3 kW-10 kW. When it comes to a power generation system with a level of 100 kW or Megawatts, a connection in parallel is usually used. In some approaches for connecting power generation systems with different characteristics in parallel, the power generation systems are isolated through a control circuit, controlled to output identical output voltages, and afterward being electrically connected in parallel. Some common parallel connecting ways includes: utilizing a control circuit, such as a direct current to direct current (DC-DC) converter, to connect the power generation systems to a direct current (DC) bus in parallel; or utilizing a control circuit, such as a DC to high frequency alternating current (DC-HFAC) converter, to convert the output voltages of the power generation systems to high frequency alternating currents, and afterwards electrically connecting the power generation systems in parallel. However, power sharing problem or load sharing problem between power supply modules may exists when the power generation systems with different characteristics are connected in parallel, and such a problem is not able be resolved by simply using common control circuits, such as DC-DC converters and DC-AC converters.

A typical load distribution circuit is usually used in a connection of power stages in parallel. In the connection of power stages in parallel, due to the power stages have identical input/output voltages, the control circuit distributes load between the power stages, and does not adjust the voltages of the power stages. Since the input/output voltages of the power stages are identical, the load distribution operation can be simplified to current sharing operation. However, in the architecture of connecting power generation modules in parallel, different power supply modules usually have different output voltages, and the parallel control circuit needs to handle load distribution and control output voltage concurrently. Hence, a control circuit developed from current sharing is not able to be directly applied to the parallel connection of power supply modules with different characteristics.

In addition, an output voltage of a fuel cell is varied in a manner along with an output current. The power supply characteristic of the fuel cell is not a constant voltage supply or a constant current supply. Moreover, when the fuel cell works at different work points, the output powers, the power conversion efficiencies, the fuel utilizations, the cell working temperatures, and the lifetimes of the fuel cell would be different, and therefore it is critical to set the work point of the fuel cell. In a parallel power generation system, when the control circuit is not able to determine the work points of each of the fuel cells, or the load distribution among the fuel cells is not able to determine when the load varied, the fuel cells may work at unsuitable work points, and therefore being damaged.

A typical parallel control circuit can adjust the output voltages when the cells are constant voltage supplies, but is not able to distribute the load. A control circuit capable of distributing the load is not able to adjust the output voltages, and only capable of distributing the load under a condition that the input voltages are identical. Since the fuel cells have unique voltage-current curves, there are significant capability differences between cell modules, and there are strict requirements for the work points, the conventional parallel circuit designs are not suitable for a parallel fuel cell system.

SUMMARY OF THE INVENTION

In one embodiment, a fuel cell system is provided, so that fuel cells connected in parallel can have different output voltages, and a voltage at a load side can be maintained under the load varied.

In one embodiment, a fuel cell system is provided, so that output power of the fuel cells can be controlled, and a power output ratio of the fuel cells can be controlled.

One aspect of the present disclosure is related to a fuel cell system. In accordance with one embodiment, the fuel cell system includes a comparator, a signal tracking controller, a first load distribution controller, a first loop gain controller, a first adder, a first pulse width modulation (PWM) controller, a first fuel cell and power converter, a second load distribution controller, a second loop gain controller, a second adder, a second PWM controller, and a second fuel cell and power converter. The comparator receives a reference voltage and a power converter output voltage, and compares the reference voltage and the power converter output voltage to output a first voltage difference signal. The signal tracking controller receives the first voltage difference signal, and amplifies the first voltage difference signal to a second voltage difference signal, and outputting the second voltage difference signal. The first load distribution controller receives the second voltage difference signal to output a first load distribution signal. The first loop gain controller receives the first load distribution signal to output a first loop gain signal. The first adder receives the first loop gain signal and a first work point reference signal and outputs a first work point setting signal according to the first loop gain signal and the first work point reference signal. The first pulse width modulation (PWM) controller receives the first work point setting signal and a first fuel cell output power signal and outputs a first duty ratio signal according to the first work point setting and the first fuel cell output power signal. The first fuel cell and power converter receives the first duty ratio signal and outputs the power converter output voltage to a load side according to the first duty ratio signal, in which the first fuel cell and power converter further outputs the first fuel cell output power signal to the first PWM controller. The second load distribution controller receives the second voltage difference signal to output a second load distribution signal. The second loop gain controller receives the second load distribution signal to output a second loop gain signal. The second adder receives the second loop gain signal and a second work point reference signal and outputs a second work point setting signal according to the second loop gain signal and the second work point reference signal. The second PWM controller receives the second work point setting signal and a second fuel cell output power signal and outputs a second duty ratio signal according to the second work point setting signal and the second fuel cell output power signal and a second fuel cell and power converter receiving the second duty ratio signal and outputs the power converter output voltage to the load side according to the second duty ratio signal, in which the second fuel cell and power converter further outputs the second fuel cell output power signal to the second PWM controller.

Additional advantages, objects, and features of embodiments of the disclosure will be set forth in part in the description which follows and in part will become apparent to those having ordinary skill in the art upon examination of the following or may be learned from practices of the embodiments of the disclosure. The objectives and other advantages of the embodiments of the disclosure may be realized and attained by the structure particularly pointed out in the written description and claims hereof as well as the appended drawings.

DETAILED DESCRIPTION OF THE PREFERRED EMBODIMENT

Figure 1:
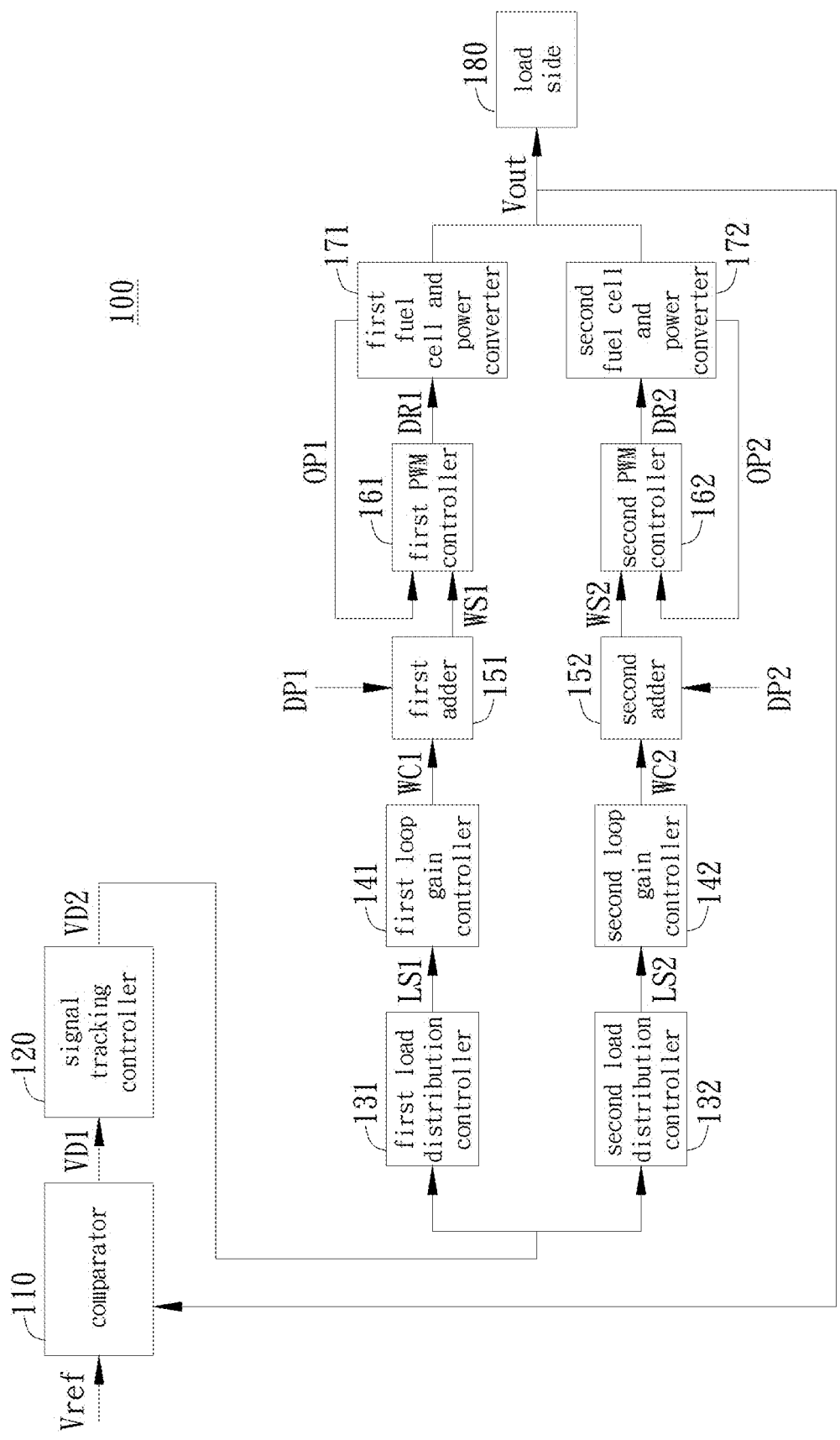
FIG. 1 is a block diagram of a fuel cell system in one embodiment of the present disclosure.

Referring to FIG. 1, FIG. 1 is a block diagram of a fuel cell system in one embodiment of the present disclosure. As shown in FIG. 1, two fuel cells connected in parallel are taken as an example in this embodiment, but more than two fuel cells may be connected in parallel in an actual application, and the present disclosure is not limited to this embodiment.

In one embodiment of the present disclosure, the fuel cell system 100 includes a comparator 110, a signal tracking controller 120, a first load distribution controller 131, a first loop gain controller 141, a first adder 151, a first pulse width modulation (PWM) controller 161, a first fuel cell and power converter 171, a second load distribution controller 132, a second loop gain controller 142, a second adder 152, a second PWM controller 162, a second fuel cell and power converter 172, and a load side 180. In this embodiment, a power supply characteristic of the first fuel cell and power converter 171 may be a non-constant voltage supply or a non-constant current supply, a power supply characteristic of the second fuel cell and power converter 172 may be a non-constant voltage supply or a non-constant current supply, and the power supply characteristic of the first fuel cell and power converter 171 is different from the power supply characteristic of the second fuel cell and power converter 172.

The comparator 110 receives a reference voltage Vref (e.g., equivalent to a rated voltage of the load side 180) and a power converter output voltage Vout, and compares the reference voltage Vref and the power converter output voltage Vout to output a first voltage difference signal VD1 to the signal tracking controller 120. The signal tracking controller 120 receives the first voltage difference signal VD1 from the comparator 110 to output a second voltage difference signal VD2 to the first load distribution controller 131 and the second load distribution controller 132, in which the second voltage difference signal VD2 is, for example, an amplified signal of the first voltage difference signal VD1. In one embodiment, the signal tracking controller 120 may include two separate signal tracking controllers (not shown). The two separated signal tracking controllers can separately receive the first voltage difference signal VD1, and separately output the second voltage difference signal VD2 to the first load distribution controller 131 and the second load distribution controller 132.

The first load distribution controller 131 receives the second voltage difference signal VD2 from the signal tracking controller 120 to output a first load distribution signal LS1 to the first loop gain controller 141. In this embodiment, the first load distribution controller 131 is configured to adjust a power distribution of the first fuel cell and power converter 171 on the load side 180. The first loop gain controller 141 receives the first load distribution signal LS1 from the first load distribution controller 131 to output a first loop gain signal WC1 to the first adder 151. In this embodiment, the first loop gain controller 141 is configured to adjust an output of the first fuel cell and power converter 171 to be the same as an output of the second fuel cell and power converter 172.

The first adder 151 receives the first loop gain signal WC1 from the first loop gain controller 141 and a first work point reference signal DP1, and outputs a first work point setting signal WS1 to the first PWM controller 161 according to the first loop gain signal WC1 and the first work point reference signal DP1. In this embodiment, the first work point reference signal DP1 is a default output power of the first fuel cell and power converter 171 for designating a work point (e.g., a working power) of the first fuel cell and power converter 171.

The first PWM controller 161 receives the first work point setting signal WS1 from the first adder 151 and a first fuel cell output power signal OP1 from the first fuel cell and power converter 171, and output a first duty ratio signal DR1 to the first fuel cell and power converter 171 according to the first work point setting signal WS1 and the first fuel cell output power signal OP1. The first fuel cell and power converter 171 receive the first duty ratio signal DR1 from the first PWM controller 161, and output the power converter output voltage Vout to the load side 180 according to the first duty ratio signal DR1.

The second load distribution controller 132 receives the second voltage difference signal VD2 from the signal tracking controller 120 to output a second load distribution signal LS2 to the second loop gain controller 142. In this embodiment, the second load distribution controller 132 is configured to adjust a power distribution of the second fuel cell and power converter 172 on the load side 180. The second loop gain controller 142 receives the second load distribution signal LS2 from the second load distribution controller 132 to output a second loop gain signal WC2 to the second adder 152. In this embodiment, the second loop gain controller 142 is configured to adjust the output of the second fuel cell and power converter 172 to be the same as the output of the first fuel cell and power converter 171.

The second adder 152 receives the second loop gain signal WC2 from the second loop gain controller 142 and a second work point reference signal DP2, and outputs a second work point setting signal WS2 to the second PWM controller 162 according to the second loop gain signal WC2 and the second work point reference signal DP2. In this embodiment, the second work point reference signal DP2 is a default output power of the second fuel cell and power converter 172 for designating a work point (e.g., a working power) of the second fuel cell and power converter 172.

The second PWM controller 162 receives the second work point setting signal WS2 from the second adder 152 and a second fuel cell output power signal OP2 from the second fuel cell and power converter 172, and output a second duty ratio signal DR2 to the second fuel cell and power converter 172 according to the second work point setting signal WS2 and the second fuel cell output power signal OP2. The second fuel cell and power converter 172 receive the second duty ratio signal DR2 from the second PWM controller 162, and output the power converter output voltage Vout to the load side 180 according to the second duty ratio signal DR2.

In one embodiment, the fuel cell system 100 uses an inner loop and outer loop control architecture. For example, an inner loop feedbacks the fuel cell output power of the first fuel cell and power converter 171, and the outer loop feedbacks the power converter output voltage Vout of the load side 180. Additionally, in one embodiment of present disclosure, by controlling system parameters of the signal tracking controller 120, the first load distribution controller 131, the first loop gain controller 141, the second load distribution controller 132, and the second loop gain controller 142, the reference voltage Vref may be substantially equal to the power converter output voltage Vout, the output power of the first fuel cell and power converter 171 may be substantially equal to the first work point reference signal DP1 (i.e., the default output power of the first fuel cell and power converter 171), and the output power of the second fuel cell and power converter 172 may be substantially equal to the second work point reference signal DP2 (i.e., the default output power of the second fuel cell and power converter 172). When the load power is varied, the load power difference can be distributed to the first fuel cell and power converter 171 and the second fuel cell and power converter 172 in a ratio between the parameter of the first load distribution controller 131 and the parameter of the second load distribution controller 132.

Figure 2A:
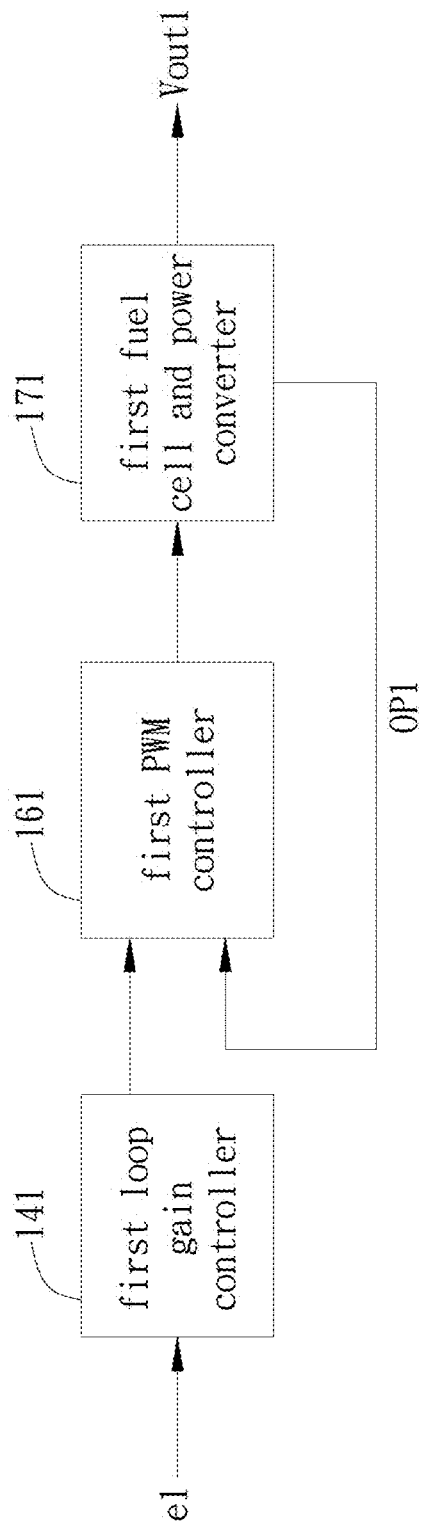
FIG. 2A is a diagram illustrating signal processing procedure corresponding to a first fuel cell and power converter in one embodiment of the present disclosure.
Figure 2B:
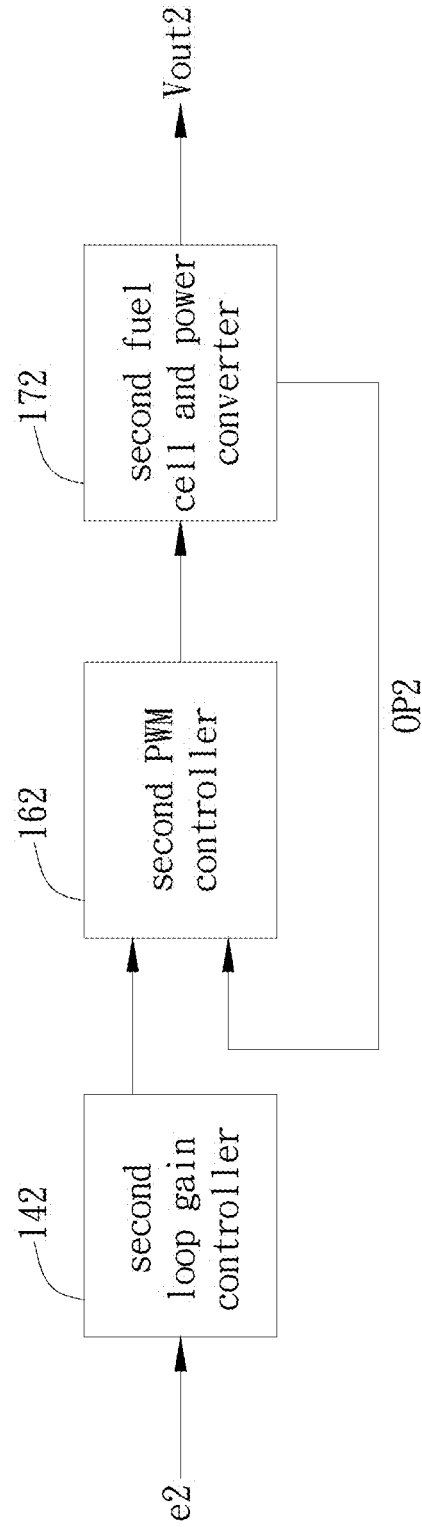
FIG. 2B is a diagram illustrating signal processing procedure corresponding to a second fuel cell and power converter in one embodiment of the present disclosure.

In one embodiment, with reference to FIG. 2A and FIG. 2B, the first loop gain controller 141 and the second loop gain controller 142 are designed in a manner that, through the first loop gain controller 141 and the second loop gain controller 142, Vout1/e1 and Vout2/e2 corresponding to different paths have similar frequency responses at low frequency. In one embodiment, e1 may be the first load distribution signal LS1, and e2 may be the second load distribution signal LS2.

In one embodiment, the first load distribution controller 131 and the second load distribution controller 132 are designed in a manner that, when the load power is varied, the first load distribution controller 131 and the second load distribution controller 132 determine a load distribution ratio of the load difference between the first fuel cell and power converter 171 and the second fuel cell and power converter 172. For example, when the load difference is distributed to the first fuel cell and power converter 171 and the second fuel cell and power converter 172 with the load distribution ratio 1:1, a system parameter scale_1 of the first load distribution controller 131 and a system parameter scale_2 of the second load distribution controller 132 may be 1:1. When the load difference is distributed to the first fuel cell and power converter 171 and the second fuel cell and power converter 172 in a manner that the power variation rates are minimum, based on an optimum formula, the system parameters can be (scale_1, scale_2)=$(P_1^2/(P_1^2+P_2^2), P_2^2/(P_1^2+P_2^2))$, in which $P_1$ and $P_2$ are power outputs of the first fuel cell and power converter 171 and the second fuel cell and power converter 172 under a rated condition, respectively.

In one embodiment, the signal tracking controller 120 is designed in a manner described below. After the designs of the first loop gain controller 141 and the second loop gain controller 142 are completed, the frequency responses corresponding to Vout1/e1 and Vout2/e2 can be used to design the outer loop, to make the fuel cell system 100 have a higher low frequency gain, and a bandwidth of the outer loop is lower than a system bandwidth of the inner loop corresponding to Vout1/e1 and Vout2/e2.

In the paragraphs below, examples are provided to describe simulation results of the fuel cell system 100 according to some embodiments.

Figure 3A:
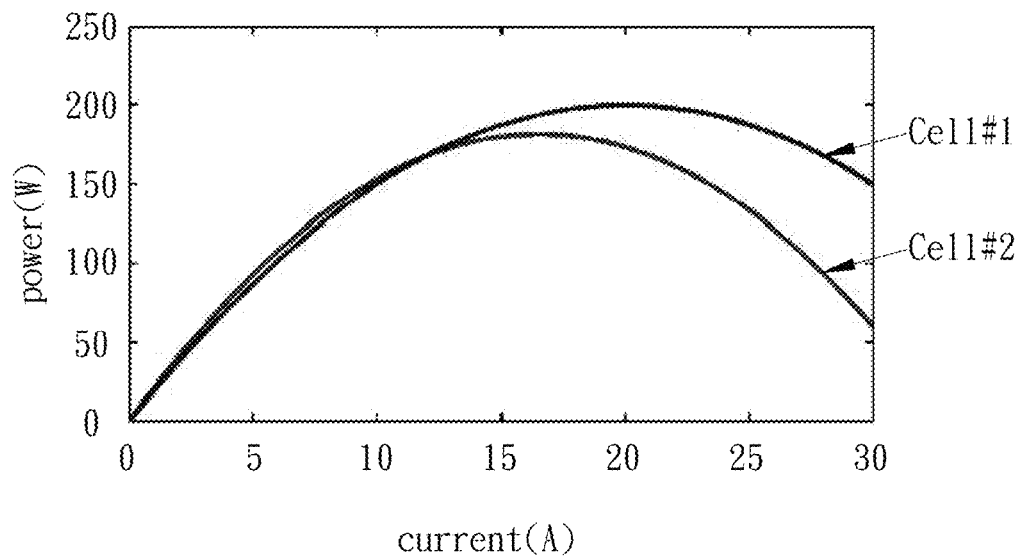
FIG. 3A is a curve diagram illustrating power-current relationships of a first fuel cell and a second fuel cell in one embodiment of the present disclosure.
Figure 3B:
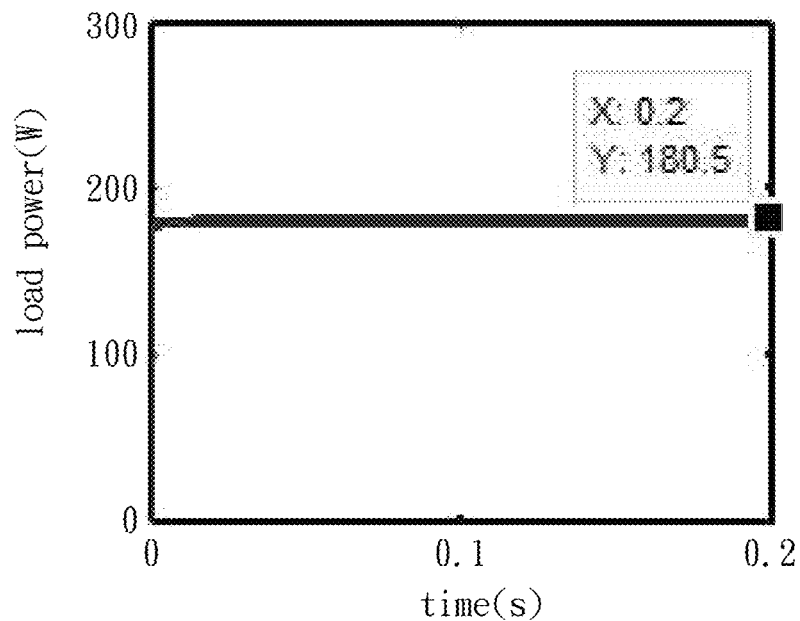
FIG. 3B is a simulation diagram illustrating a relationship between a load power and time in one embodiment of the present disclosure.
Figure 3C:
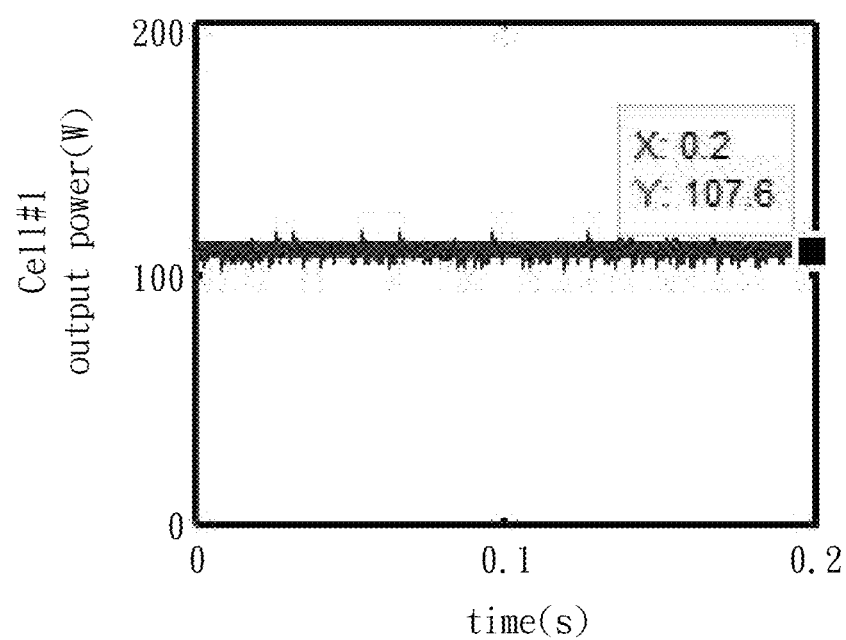
FIG. 3C is a simulation diagram illustrating a relationship between an output power of the first fuel cell and time in one embodiment of the present disclosure.
Figure 3D:
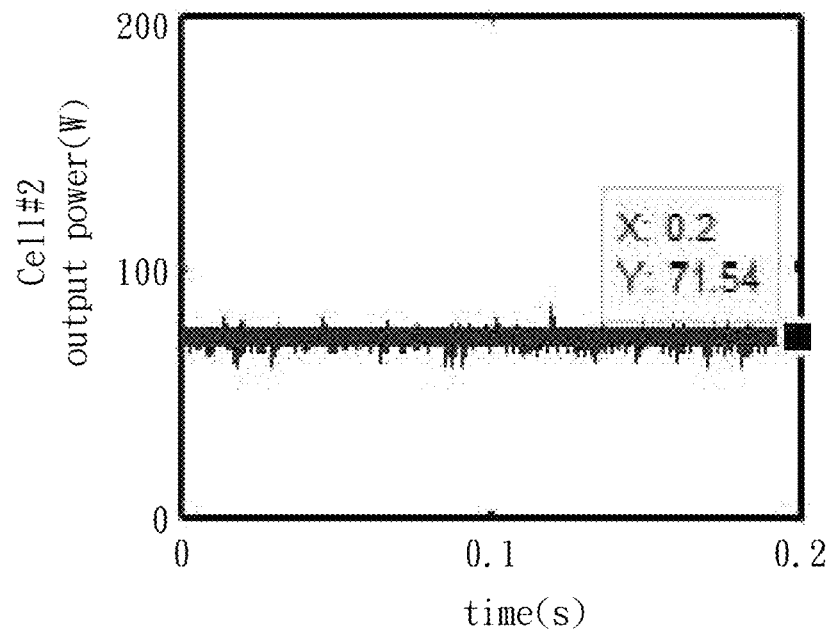
FIG. 3D is a simulation diagram illustrating a relationship between an output power of the second fuel cell and time in one embodiment of the present disclosure.
Figure 3E:
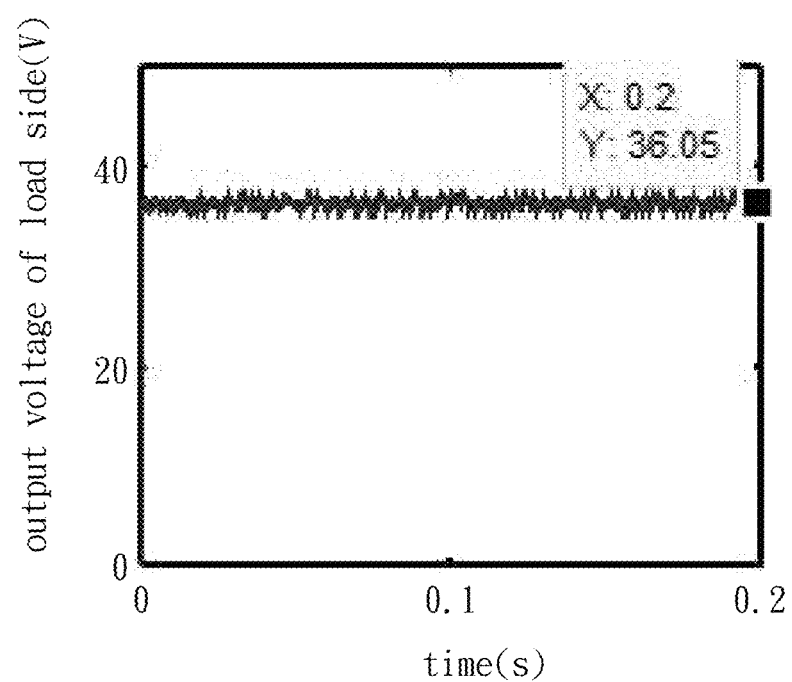
FIG. 3E is a simulation diagram illustrating a relationship between an output voltage of a load side and time in one embodiment of the present disclosure.

Referring to FIG. 3A to FIG. 3E, which are diagrams corresponding to a rated load in one embodiment of the present disclosure. FIG. 3A is a curve diagram illustrating power-current relationships of the first fuel cell and the second fuel cell in one embodiment of the present disclosure. FIG. 3B is a simulation diagram illustrating a relationship between a load power and time in one embodiment of the present disclosure. FIG. 3C is a simulation diagram illustrating a relationship between an output power of the first fuel cell and time in one embodiment of the present disclosure. FIG. 3D is a simulation diagram illustrating a relationship between an output power of the second fuel cell and time in one embodiment of the present disclosure. FIG. 3E is a simulation diagram illustrating a relationship between an output voltage of the load side and time in one embodiment of the present disclosure. In these diagrams, cell #1 indicates the first fuel cell, and cell #2 indicates the second fuel cell.

Under the rated load, it is assumed that the reference voltage Vref (e.g., the rated voltage of the load side 180) is 36V, a load power requirement is 180 W, the default output power of the first fuel cell and power converter 171 (e.g., the first work point reference signal DP1) is 108 W, and the default output power of the second fuel cell and power converter 172 (e.g., the second work point reference signal DP2) is 72 W. By using the control circuit (e.g., includes the signal tracking controller 120, the first load distribution controller 131, the first loop gain controller 141, the second load distribution controller 132, and the second loop gain controller 142) to connect two fuel cells (e.g., the first fuel cell and power converter 171 and the second fuel cell and power converter 172) with different characteristic in parallel, the total output power of the load side 180 is about 180.5 W (see FIG. 3B), the output power of the first fuel cell is about 107.6 W (see FIG. 3C), the output power of the second fuel cell is about 71.54 W (see FIG. 3D), and the output voltage of the output side 180 is about 36.05 V (see FIG. 3E). The values above are substantially identical to the rated power inputs (e.g., the signals DP1, DP2) and the rated load voltage (e.g., the reference voltage Vref) in the designation of the control system.

Figure 4A:
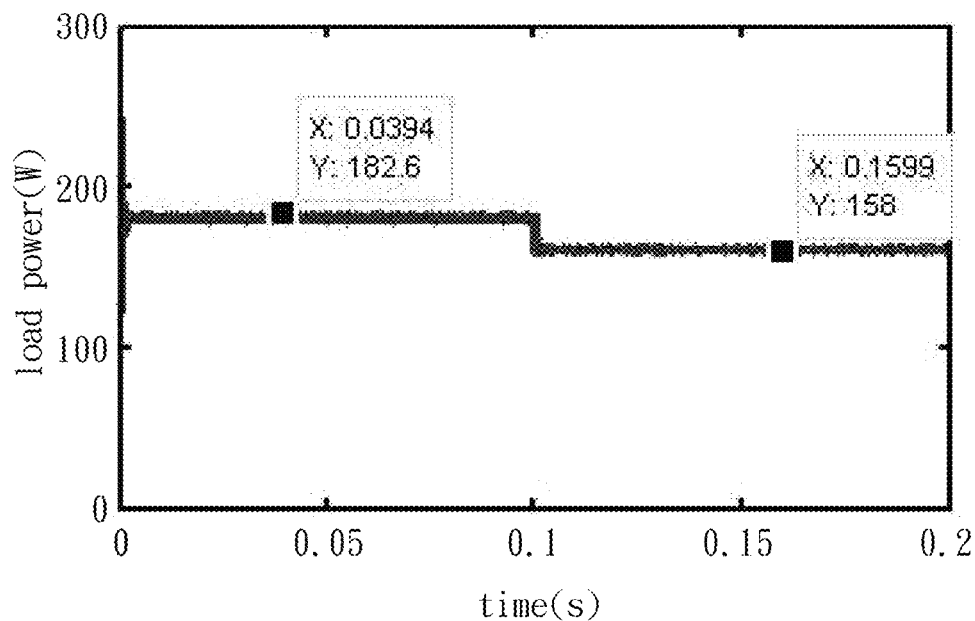
FIG. 4A is a simulation diagram illustrating a relationship between a load power and time in one embodiment of the present disclosure.
Figure 4B:
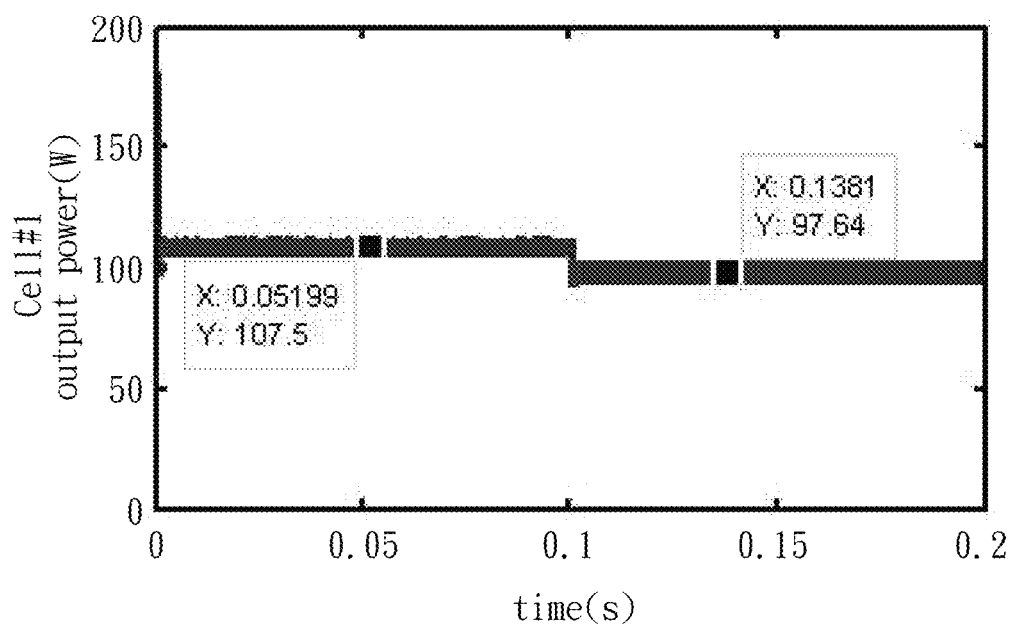
FIG. 4B is a simulation diagram illustrating a relationship between an output power of the first fuel cell and time in one embodiment of the present disclosure.
Figure 4C:
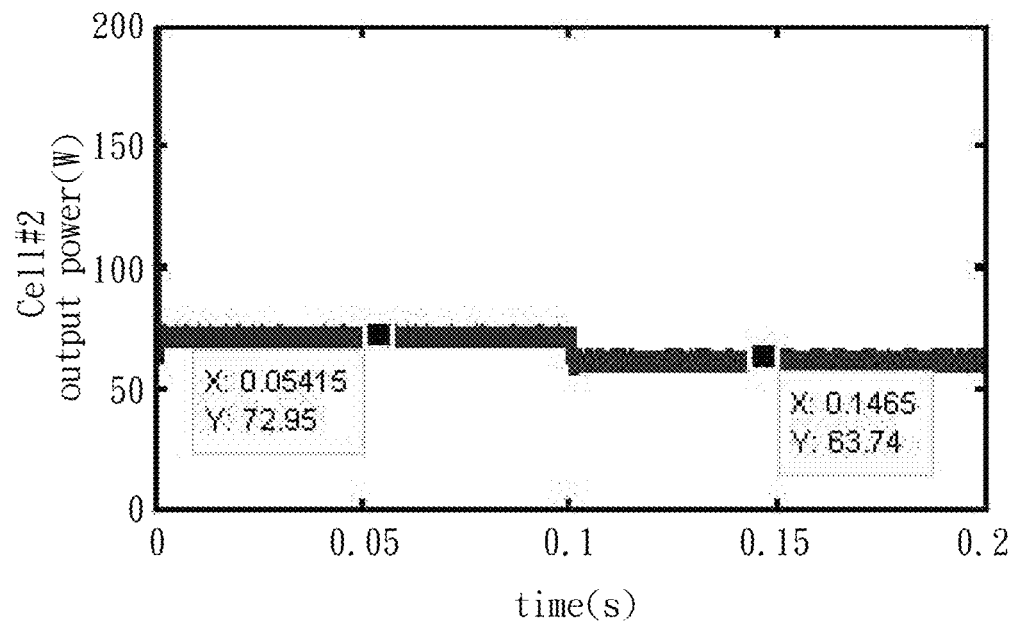
FIG. 4C is a simulation diagram illustrating a relationship between an output power of the second fuel cell and time in one embodiment of the present disclosure.
Figure 4D:
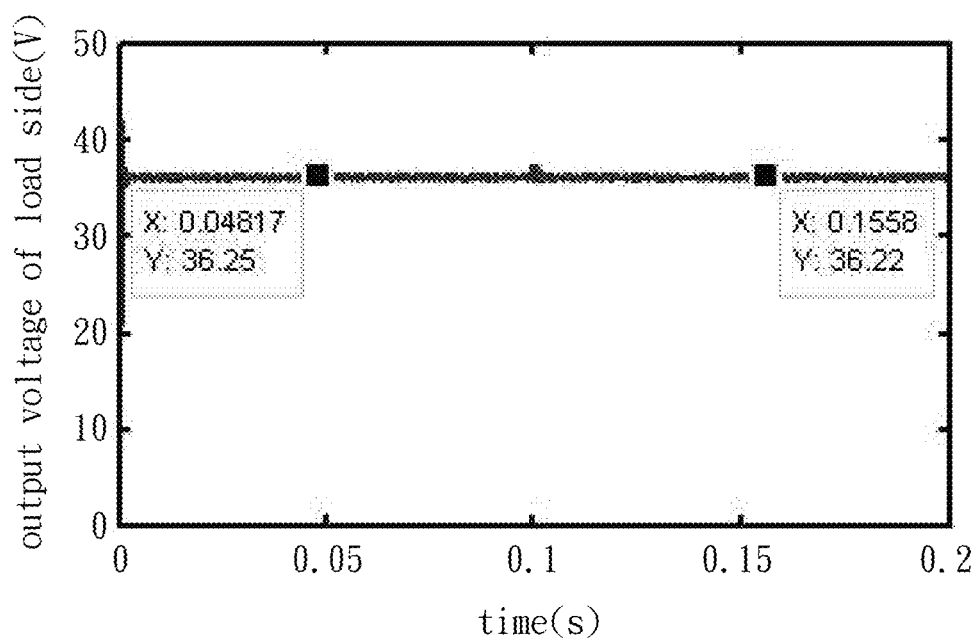
FIG. 4D is a simulation diagram illustrating a relationship between an output voltage of the load side and time in one embodiment of the present disclosure.

Referring to FIG. 4A to FIG. 4D, which are simulation diagrams corresponding to load variation in one embodiment of the present disclosure. FIG. 4A is a simulation diagram illustrating a relationship between a load power and time in one embodiment of the present disclosure. FIG. 4B is a simulation diagram illustrating a relationship between an output power of the first fuel cell and time in one embodiment of the present disclosure. FIG. 4C is a simulation diagram illustrating a relationship between an output power of the second fuel cell and time in one embodiment of the present disclosure. FIG. 4D is a simulation diagram illustrating a relationship between a voltage of the load side and time in one embodiment of the present disclosure. In these diagrams, cell #1 indicates the first fuel cell, and cell #2 indicates the second fuel cell.

In load variation, it is assumed that the load power is decreased from original power 180 W to 160 W (see FIG. 4A), a ratio between the system parameter scale_1 of the first load distribution controller 131 and the system parameter scale_2 of the second load distribution controller 132 are 1:1. At the beginning, the output power of the first fuel cell is about 107.5 W (see FIG. 4B), the output power of the second fuel cell is about 73 W (see FIG. 4C), and the output voltage of the output side 180 is about 36.25 V (see FIG. 4D). When the load power is decreased to 160 W, the output power of the first fuel cell is about 97.64 W (see FIG. 4B), the output power of the second fuel cell is about 63.74 W (see FIG. 4C), and the output voltage of the output side 180 is about 36.25 V (see FIG. 4D).

According to the simulation, when the load power is decreased by 20 W, the output voltage of the output side 180 can be maintained at the setting value (around 36V), and each of the decreases of the output powers of the first and second fuel cells are about 10 W, and that is, the ratio of the decreases is 1:1, which is identical to the setting ratio of the parameters (scale_1:scale_2) of the distribution controllers.

Additionally, the output power variation rate of the first fuel cell is 9.3% (substantially identical to 10/107.5), and the output power variation rate of the second fuel cell is 13.7% (substantially identical to 10/73).

Figure 5A:
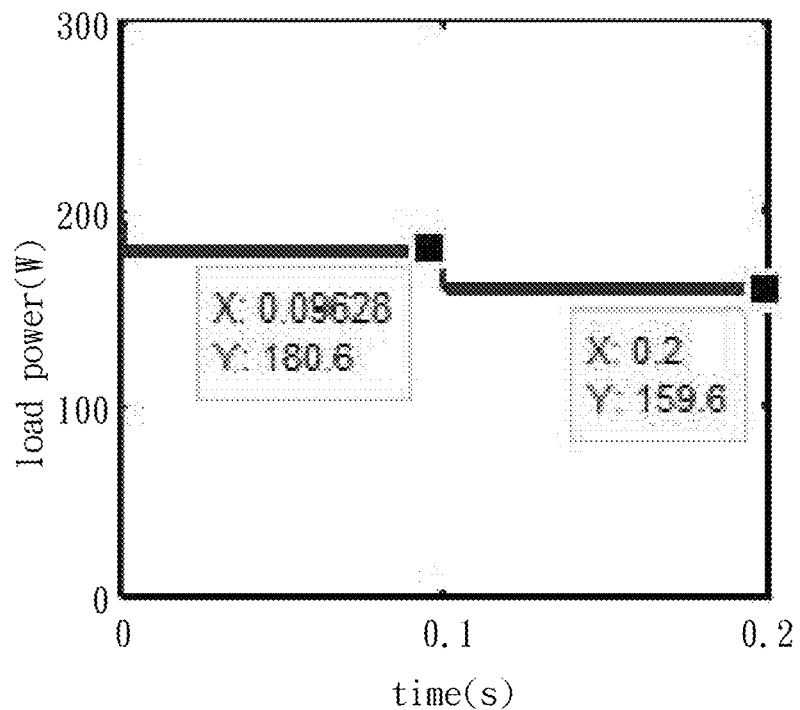
FIG. 5A is a simulation diagram illustrating a relationship between a load power and time in one embodiment of the present disclosure.
Figure 5B:
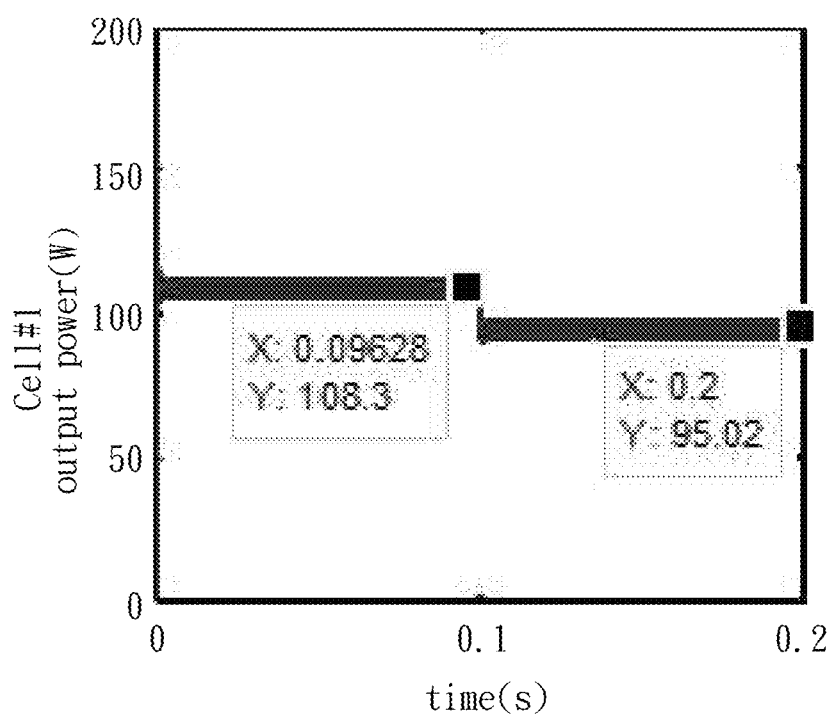
FIG. 5B is a simulation diagram illustrating a relationship between an output power of the first fuel cell and time in one embodiment of the present disclosure.
Figure 5C:
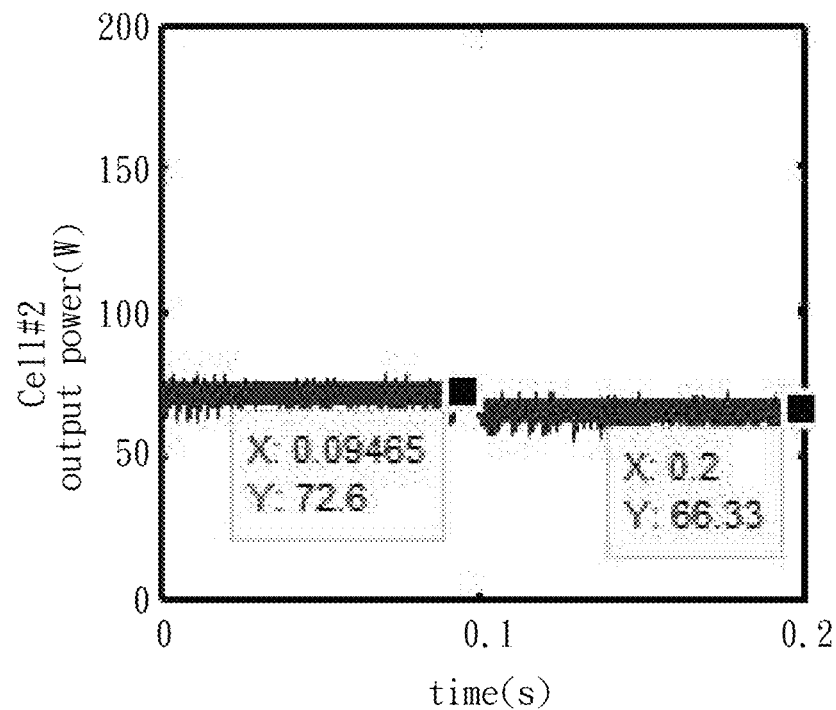
FIG. 5C is a simulation diagram illustrating a relationship between an output power of the second fuel cell and time in one embodiment of the present disclosure.
Figure 5D:
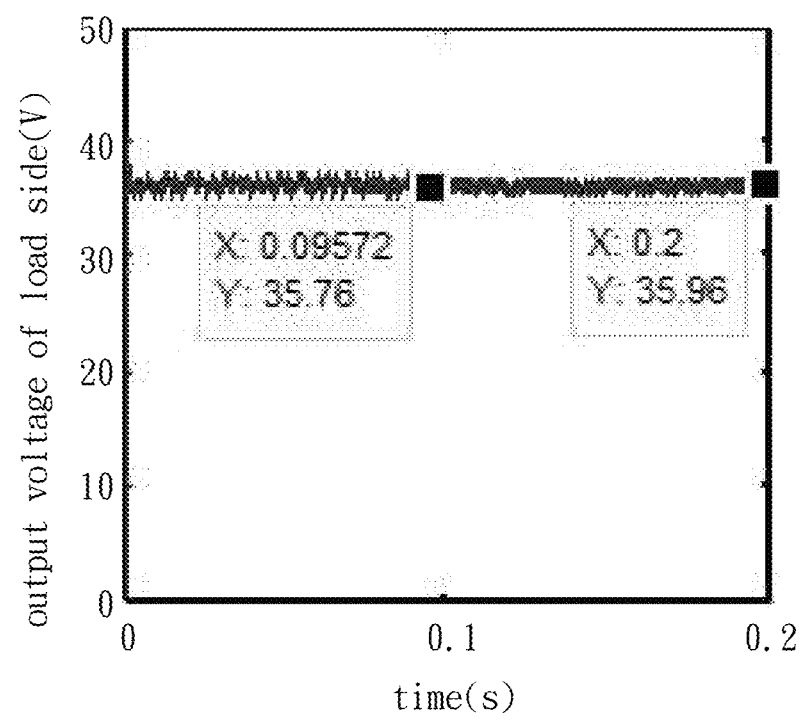
FIG. 5D is a simulation diagram illustrating a relationship between an output voltage of the load side and time in one embodiment of the present disclosure.

Referring to FIG. 5A to FIG. 5D, which are simulation diagrams corresponding to load variation in one embodiment of the present disclosure. FIG. 5A is a simulation diagram illustrating a relationship between a load power and time in one embodiment of the present disclosure. FIG. 5B is a simulation diagram illustrating a relationship between an output power of the first fuel cell and time in one embodiment of the present disclosure. FIG. 5C is a simulation diagram illustrating a relationship between an output power of the second fuel cell and time in one embodiment of the present disclosure. FIG. 5D is a simulation diagram illustrating a relationship between a voltage of the load side and time in one embodiment of the present disclosure. In these diagrams, cell #1 indicates the first fuel cell, and cell #2 indicates the second fuel cell.

The simulation conditions corresponding to FIG. 5A to FIG. 5D are similar to the simulation conditions corresponding to FIG. 4A to FIG. 4D, and the difference is that the setting ratio of the parameters (scale_1:scale_2) of the distribution controllers is set to minimize the power variation rates. As illustrated in the simulation results, after the load power is varied to 160 W at 0.1 second (see FIG. 5A), the output power of the first fuel cell is about 95.02 W (see FIG. 5B), the output power of the second fuel cell is about 66.33 W (see FIG. 5C), and the output voltage of the output side 180 is maintained at around 36V (see FIG. 5D). Accordingly, when the load power is decreased by 20 W, the ratio of the of the output power decreases of the first and second fuel cells are (108.3−95.02):(72.6−66.33)≈0.68:0.32, which is substantially identical to the setting ratio of the parameters (scale_1:scale_2) of the distribution controllers. Additionally, the output power variation rate of the first fuel cell is 12% (substantially identical to 13.28/108.3), and the output power variation rate of the second fuel cell is 8.6% (substantially identical to 6.27/72.6). Thus, under the load varied, a power distribution design with such a setting ratio can decrease variations of the work points of the fuel cells.

Figure 6:
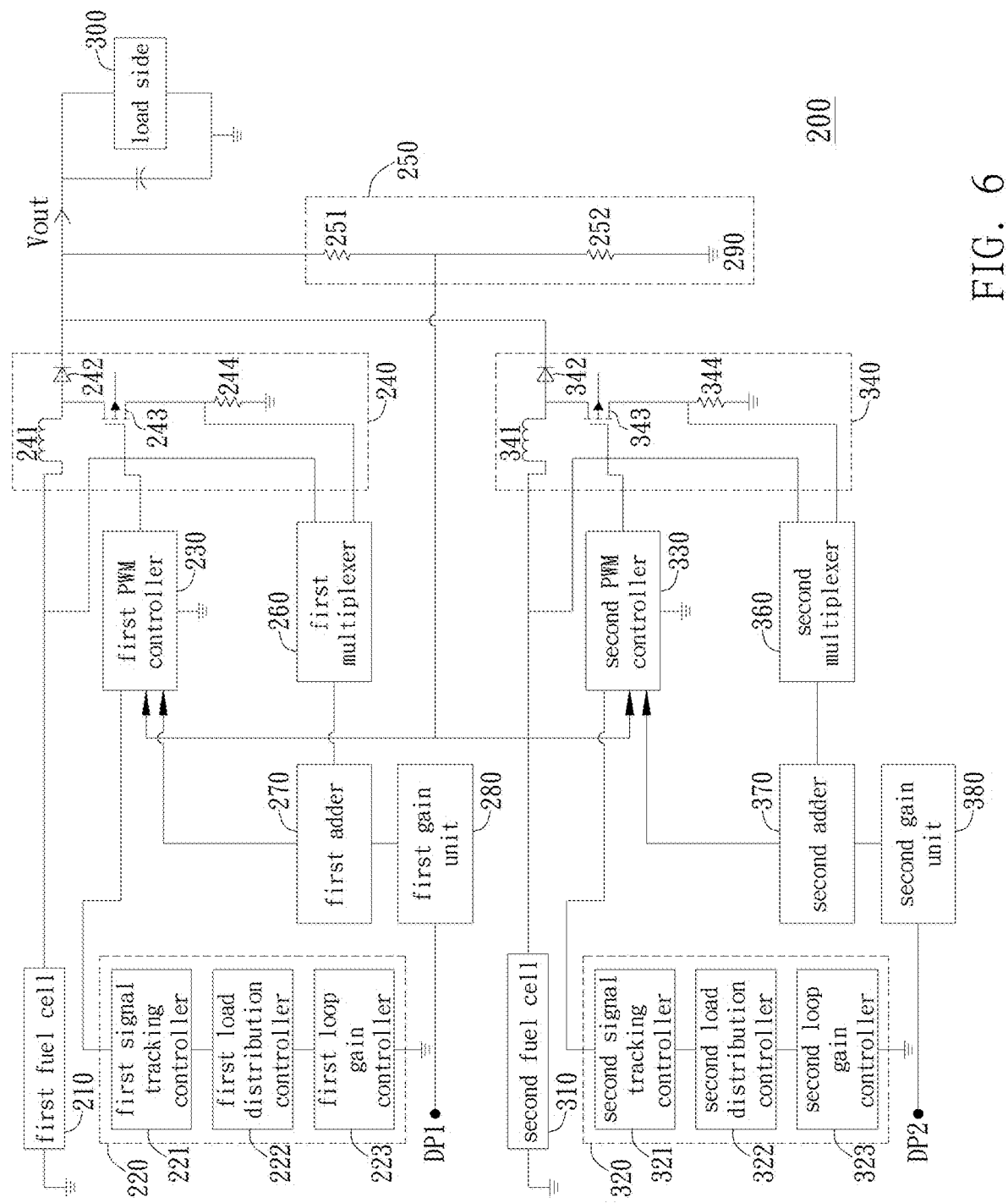
FIG. 6 is a schematic diagram of a fuel cell system in another embodiment of the present disclosure.

Referring to FIG. 6, FIG. 6 is a schematic diagram of a fuel cell system in another embodiment of the present disclosure. As shown in FIG. 6, two fuel cells connected in parallel are taken as an example in this embodiment, but more than two fuel cells may be connected in parallel in an actual application, and the present disclosure is not limited to this embodiment.

In this embodiment, the fuel cell system 200 includes a first fuel cell 210, a first control circuit 220, a first PWM controller 230, a first power converting circuit 240, a sensing circuit 250, a first multiplexer 260, a first adder 270, a first gain unit 280, a load side 300, a second fuel cell 310, a second control circuit 320, a second PWM controller 330, a second power converting circuit 340, a second multiplexer 360, a second adder 370, and a second gain unit 380. In this embodiment, a power supply characteristic of first fuel cell 210 may be a non-constant voltage supply or a non-constant current supply, a power supply characteristic of the second fuel cell 310 may be a non-constant voltage supply or a non-constant current supply, and the power supply characteristic of the first fuel cell 210 is different from the power supply characteristic of the second fuel cell 310.

The first control circuit 220 includes a first signal tracking controller 221, a first load distribution controller 222, and a first loop gain controller 223, in which functions of the first signal tracking controller 221, the first load distribution controller 222, and the first loop gain controller 223 may be implemented by using a set of circuits. The first power converting circuit 240 can be implemented by using an inductor 241, a diode 242, a switch 243, and a resistor 244 shown in FIG. 6. However another implementation with circuits may also be used, and the present disclosure is not limited to this embodiment.

The sensing circuit 250 includes a first resistor 251 and a second resistor 252 electrically connected in series between the load side 300 and a ground side 290. However another implementation with circuits may also be used, and the present disclosure is not limited to this embodiment.

The second control circuit 320 includes a second signal tracking controller 321, a second load distribution controller 322, and a second loop gain controller 323, in which functions of the second signal tracking controller 321, the second load distribution controller 322, and the second loop gain controller 323 may be implemented by using an identical circuit. The second power converting circuit 340 can be implemented by using an inductor 341, a diode 342, a switch 343, and a resistor 344 shown in FIG. 6. However another implementation with circuits may also be used, and the present disclosure is not limited to this embodiment.

According to one embodiment of the present disclosure, the fuel cell system uses an inner loop and outer loop control architecture to perform DC power conversion, in which the inner loop feedbacks a signal corresponding to an output power of a fuel cell, and an outer loop feedbacks a signal corresponding to a voltage of a load side. Additionally, in one embodiment of the present disclosure, the fuel cell system can connect power generation modules with characteristics of non-constant voltage supply or non-constant voltage supply (e.g., the first fuel cell and the second fuel cell described above), in which the power generation modules connected in parallel have different voltage-current characteristics, and the fuel cell system can control rated output powers of each power generation modules. Under the load varied, a load distribution ratio of the load difference can be adjusted, and power variation rates of the fuel cells can be minimized.

Although the present disclosure has been described in considerable detail with reference to certain embodiments thereof, other embodiments are possible. Therefore, the scope of the appended claims should not be limited to the description of the embodiments contained herein.

What is claimed is:

1. A fuel cell system comprising:
a comparator receiving a reference voltage and a power converter output voltage, and comparing the reference voltage and the power converter output voltage to output a first voltage difference signal;
a signal tracking controller receiving the first voltage difference signal from the comparator, and amplifying the first voltage difference signal to generate a second voltage difference signal, and outputting the second voltage difference signal;
a first load distribution controller receiving the second voltage difference signal from the signal tracking controller to output a first load distribution signal;
a first loop gain controller receiving the first load distribution signal from the first load distribution controller to output a first loop gain signal;
a first adder receiving the first loop gain signal and a first work point reference signal from the first loop gain controller, and outputting a first work point setting signal according to the first loop gain signal and the first work point reference signal;
a first pulse width modulation (PWM) controller receiving the first work point setting signal from the first adder and a first fuel cell output power signal from the first fuel cell and power converter, and outputting a first duty ratio signal according to the first work point setting and the first fuel cell output power signal;
a first fuel cell and power converter receiving the first duty ratio signal from the first PWM controller, and outputting the power converter output voltage to a load side according to the first duty ratio signal, wherein the first fuel cell and power converter further outputs the first fuel cell output power signal to the first PWM controller;
a second load distribution controller receiving the second voltage difference signal from the signal tracking controller to output a second load distribution signal;
a second loop gain controller receiving the second load distribution signal from the second load distribution controller to output a second loop gain signal;
a second adder receiving the second loop gain signal from the second loop gain controller and a second work point reference signal, and outputting a second work point setting signal according to the second loop gain signal and the second work point reference signal;
a second PWM controller receiving the second work point setting signal from the second adder and a second fuel cell output power signal from the second fuel cee and power converter, and outputting a second duty ratio signal according to the second work point setting signal and the second fuel cell output power signal; and
a second fuel cell and power converter receiving the second duty ratio signal from the second PWM controller, and outputting the power converter output voltage to the load side according to the second duty ratio signal, wherein the second fuel cell and power converter further outputs the second fuel cell output power signal to the second PWM controller;
wherein the first load distribution controller is configured to adjust a power distribution of the first fuel cell and power converter on the load side, and the second load distribution controller is configured to adjust a power distribution of the second fuel cell and power converter on the load side;
wherein the first loop gain controller and the second loop gain controllers are configured to ensure that an output of the first fuel cell and power converter and an output of the second fuel and cell power converter are the same.

2. The fuel cell system as claimed in claim 1, wherein the signal tracking controller includes a first signal tracking controller and a second signal tracking controller, the first signal tracking controller is configured to receive the first voltage difference signal to output the second voltage difference signal to the first load distribution controller, and the second signal tracking controller is configured to receive the first voltage difference signal to output the second voltage difference signal to the second load distribution controller.

3. The fuel cell system as claimed in claim 1, wherein the second voltage difference signal is an amplified signal of the first voltage difference signal.

4. The fuel cell system as claimed in claim 1, wherein the first load distribution signal is used to allocate the extra load to the first fuel cell when the load changes, and the second load distribution signal is used to allocate the extra load to the second fuel cell when the load change.

5. The fuel cell system as claimed in claim 1, wherein the first work point reference signal includes a default output power of the first fuel cell for designating a work point of the first fuel cell, and the second work point reference signal includes a default output power of the second fuel cell for designating a work point of the second fuel cell.

6. The fuel cell system as claimed in claim 1, wherein an output power of the first fuel cell varied according to the first work point reference signal, and an output power of the second fuel cell varied according to the second work point reference signal.

7. The fuel cell system as claimed in claim 1, wherein a power supply characteristic of the first fuel cell and power converter is different from a power supply characteristic of the second fuel cell and power converter.

8. The fuel cell system as claimed in claim 1, wherein the reference voltage is a rated voltage of the load side.

* * * * *